Aug. 16, 1927.

C. C. BUCK 1,639,554

FOX FEED TROUGH

Filed Oct. 23, 1926

INVENTOR.
C. C. Buck,
BY
Geo. F. Kimmel
ATTORNEY.

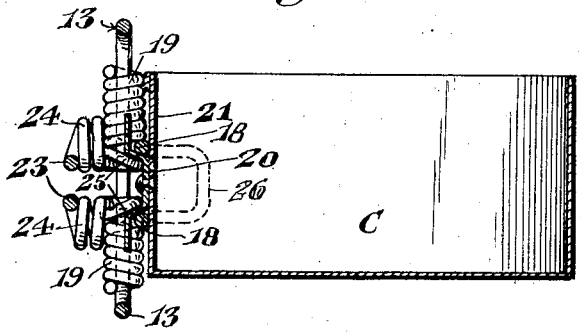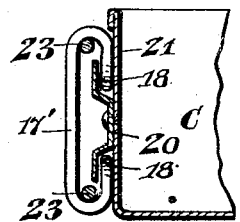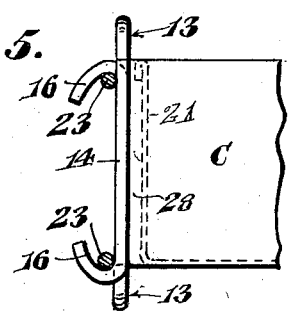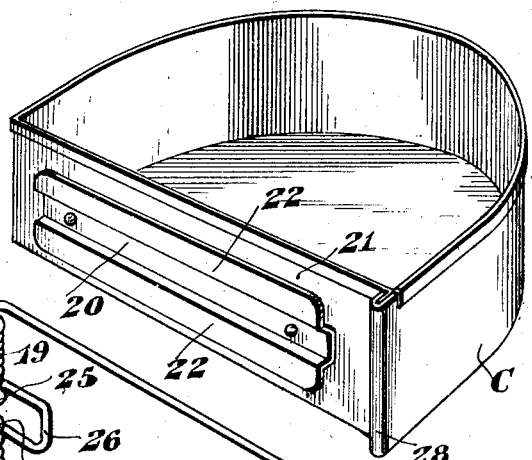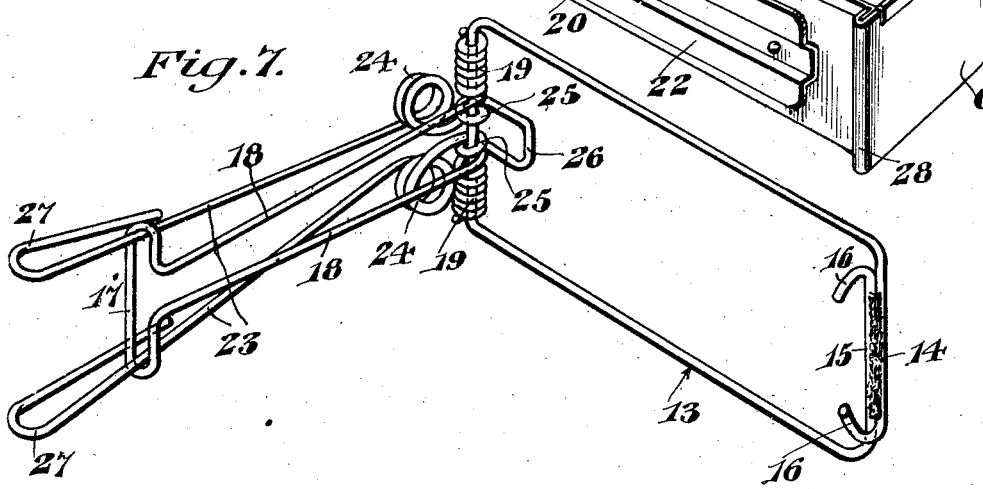

Patented Aug. 16, 1927.

1,639,554

UNITED STATES PATENT OFFICE.

CEPHAS C. BUCK, OF SANDPOINT, IDAHO.

FOX FEED TROUGH.

Application filed October 23, 1926. Serial No. 143,671.

This invention relates to a trough or cup and support therefor for holding drinking water or feed for animals, fowls, or the like.

The primary object of the invention is the provision of a device of this character, wherein a container in the form of a trough or cup designed for the reception of water or feeding material can be removably supported upon the wire netting or fence of an enclosure, for animals, fowls, or the like, so that the same will have free access to such trough or cup, either for feeding or drinking purposes, the support being of novel form to permit not only the detachment of such trough or cup, but also to allow it to be swung outside of the enclosure or projected therein and when outside the feed or water can be conveniently introduced for the filling of such trough or cup, thereby eliminating the necessity of an attendant entering the enclosure for such purpose.

Another object of the invention is the provision of a trough or cup of this character, wherein it is separable from the holder, which latter is a unit independent of the unit constituting the trough or cup, so that the latter when removed can be conveniently cleaned or transported to a point for the convenient filling thereof, the opening or way for the trough or cup in the support being shielded on the removel of such trough or cup from the holder so as to preclude the escape of the animals from the enclosure through such opening, the device being designed primarily for feeding foxes or the like imprisoned within an enclosure.

A further object of the invention is the provision of a device of this character, wherein the mounting of the support for the trough is of novel form so that it can be conveniently fastened to a wire fence or other wire netting serving as an enclosure for animals, fowls, or the like, the trough being also of novel form and carried by the support in a novel manner, whereby it may be swung to project within the enclosure or shifted outside of the same with dispatch and when projected within the enclosure will be locked in such position, thereby assuring free accessibility to such trough or cup.

A still further object of the invention is the provision of a device of this character, wherein the parts thereof are of unique form, assuring compactness and convenience in the handling of such trough or cup when associated with an enclosure for animals, fowls, or the like, for the purpose of watering or feeding the same.

A still further object of the invention is the provision of a device of this character, which is comparatively simple in construction, possessing but few parts, assembled in a manner to effect several units, thoroughly reliable and efficient in its purpose, strong, durable, and inexpensive to manufacture and install.

With these and other objects in view, the invention consists in the features of construction, combination and arrangement of parts, as will be hereinafter more fully described, in detail, illustrated in the accompanying drawing, embodying the preferred construction of the invention, and pointed out in the claims hereunto appended.

In the accompanying drawing:—

Figure 3 is a sectional view taken on the line 3—3 of Figure 2, looking in the direction of the arrow.

Figure 4 is a fragmentary vertical sectional view taken on the line 4—4 of Figure 1.

Figure 5 is a fragmentary sectional view taken on the line 5—5 of Figure 2.

Figure 6 is a perspective view of the trough or cup removed from its support or holder.

Figure 7 is a perspective view of the support or holder for the trough showing the same as a unit and in open position as illustrated by dotted lines in Figure 2 the cup or trough being detached or removed.

Similar reference characters indicate corresponding parts throughout the several views in the drawings.

Figure 2:
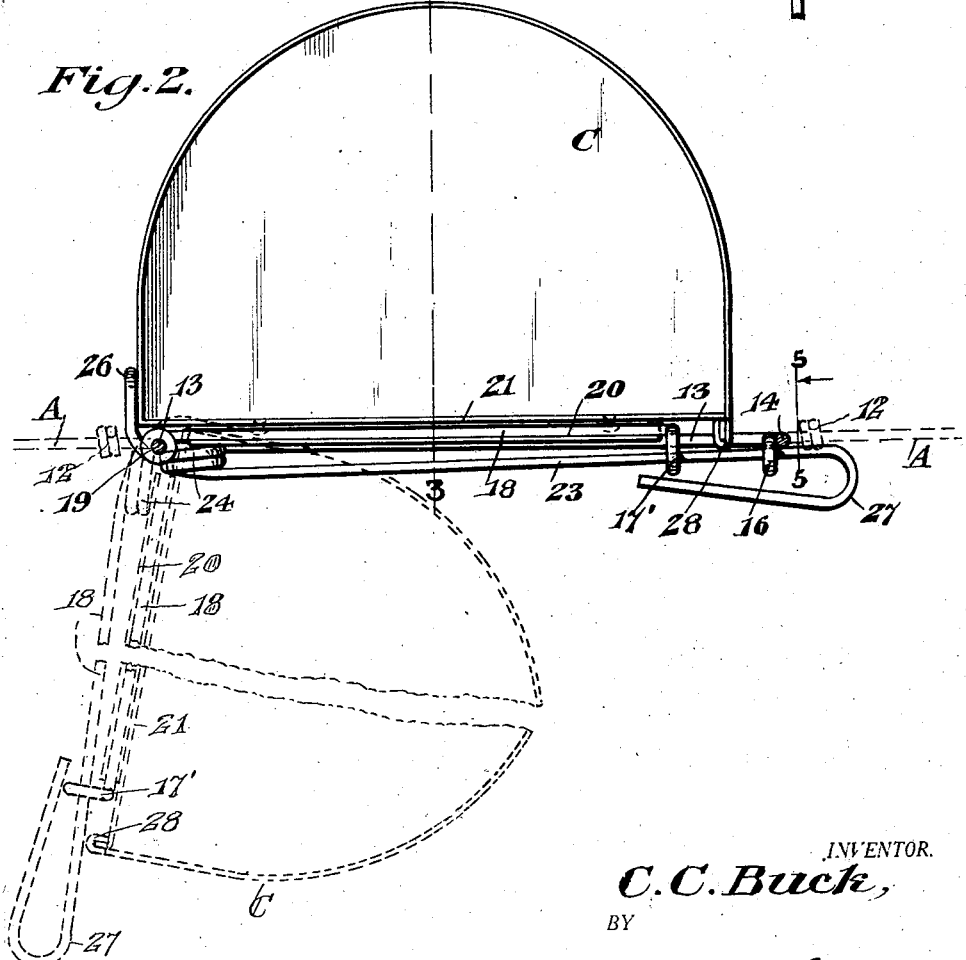
Figure 2 is a top plan view taken on the line 2—2 of Figure 1, showing by full lines the trough or cup in position to project within an enclosure and by dotted lines the said trough or cup swung outwardly to be outside or exteriorly of such enclosure.

Referring to the drawings in detail, A designates generally a portion of a wire fence, the same being of conventional form, including spaced longitudinal wires 10 and vertical transverse wires 11, which are spaced apart as usual and locked at 12 to said longitudinal wires to constitute a net fabric for an enclosure for animals, fowls, or the like. Adapted to be located at one of the openings B constituted and framed by the longitudinal and transverse wires 11 and 12 of the fence A is a trough or cup C, the body of which is preferably made from sheet metal, galvanized and of the shape shown in Figures 2 and 6, respectively, of the drawings. However, it is to be understood that such cup C may be made from any other suitable material and of other shape if found desirable.

The support or holder for the cup C, which in itself is a unit, comprises a substantially rectangular shaped main attaching frame 13 preferably made from a single length of wire bent on itself into the shape indicated with the end portions of said wire disposed in overlapped parallel relation as indicated at 14 and 15, these being soldered or otherwise united, with the terminals of said end portions bent outwardly and inwardly in opposite directions to provide opposed companion keepers 16 projecting laterally outside of said frame 13 for a purpose presently described.

Figure 1:
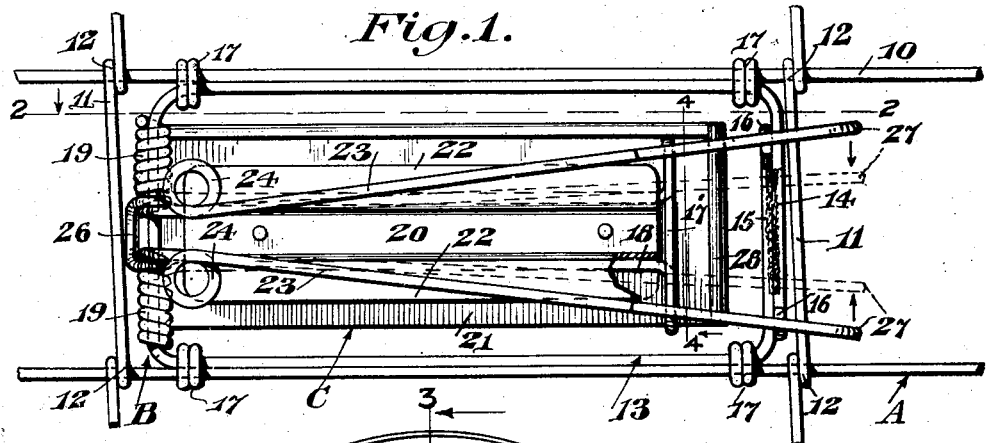
Figure 1 is a fragmentary elevation of a wire netting or fence constituting the wall of an enclosure, showing the device constructed in accordance with the invention applied thereto and by full lines the trough or cup as locked against swinging movement, while dotted lines appearing in this view show the cup or trough released for the free swinging of the same outwardly of said enclosure.

The frame 13 is of a size substantially equal to the size of the opening B in the fence A and is disposed to register with such opening as shown in Figure 1 of the drawings and fastened to the longitudinal wires 10 of said fence by double coils 17, these being trained about the longitudinal stretches of the frame 13, so that it will be secured in said opening B of the said fence A. Of course, it is to be understood that the dimensions of the main frame 13 may be varied to accomodate it to the size of the opening B, whether it be in the wire fence A or other enclosure wall, and likewise said frame 13 may be otherwise secured in position in the opening to meet the demand in any event.

Connected with the frame 13 on its end opposite the keepers 16 is a combined supporting and closure element formed from a single length of wire bent on itself to provide an outer open guide loop 17' at right angles to spaced arms 18 formed from the wire and coextensive with each other and terminating remote from the loop 17' in convoluted or coiled pintle eyes 19, these being loosely trained about the frame 13 to swingingly connect the combined supporting and closure element therewith as is clearly indicated in Figure 7 of the drawings. The space between the arms 18 opening through the loop 17' is designed to removably receive a cleat 20 riveted or otherwise fastened to the back or rear wall 21 of the trough or pan C, the cleat being bent to provide retaining flanges 22 spaced from the rear wall 21, so as to overlie the arms 18 of the combined supporting and closure element when said cleat is inserted in the open loop 17' and slid or moved between the arms 18 for the detachable mounting of the trough or cup therein, so that when said combined supporting and closure element is swung toward or away from the frame 13 the trough C held by the combined supporting and closure element will pass through the frame 13 to be projected within the enclosure at the inside of the fence A or outwardly to be disposed outside of the fence for the positioning of the trough or cup C as is clearly illustrated in Figure 2 of the drawings.

Working in the loop 17' of the combined supporting and closure element are expensible latch arms 23, these being made from a single length of wire bent on itself to form resilient coils 24 at the inner portions of the latch arms 23 and pivot eyes 25 swingingly connecting the pair of arms 23 to the frame between the coils 19 of the combined supporting and closure element and an abutment ear or extension 26 and disposed at right angles to the plane of the arms 23 in said combined supporting and closure element. This extension or ear 26 rests against one end of the trough or cup C at the corner thereof next to said extension or ear, so that the cup will be limited in its sliding movement between the arms 18 when being attached thereto, and also will brace the cup or trough C at said corner for the positive swinging thereof with the combined supporting and closure element. The arms 23 at their outer ends are turned on themselves to provide handles 27 and these arms 23 are adapted to detachably engage in the keepers 16 when the combined supporting and closure element is swung into the frame 13 in substantial vertical alignment therewith, so as to fasten the trough or cup C in fixed position projected within the enclosure for the animals. To release the arms 23 the handles 27 are compressed or pinched toward each other which disengages said arms 23 from the keepers 16 inwardly out of the path of the same so that on outward pulling upon the arms the combined supporting and closure element can be swung outwardly from the full line position in Figure 2 in the drawings to the dotted line position indicated in said figure of the drawings. When the combined supporting and closure element is swung outwardly the trough or cup C is carried therewith and free access can be had to the same for the filling thereof with feed or water.

The trough or cup C at the right hand corner thereof is provided with a lip or tongue 28 designed to abut the loop 17' so as to prevent the trough or cup C from being inserted in the combined supporting and closure element too far, should the extension or ear 26 at the pivot end of such element become deformed or displaced under severe usage of the device. The element constituted by the loop 17' and the arms 18 serves as a swinging carrier for the trough or cup C, a support for the latter, and a closure for the frame, as will be clearly apparent.

When the trough or cup C is swung outwardly exteriorly of the enclosure it is readily accessible for the filling thereof with water or food for the animal or animals or the same can be conveniently detached from the combined suporting and closure element carrying it so that it may be washed to render the same sanitary or transported to a point convenient for the filling of the said trough or cup as will be obvious.

From the foregoing it is thought that the construction and manner of use of the device will be clearly understood and therefore a more extended explanation has been omitted.

What is claimed is:—

1. A device of the character described, comprising a frame adapted to be mounted in an opening of an enclosure, a combined supporting and closure element swingingly connected with the frame, a container removably carried by said element, and means on the element for locking the same closed relative to the frame.

2. A device of the character described, comprising a frame adapted to be mounted in an opening of an enclosure, a combined supporting and closure element swingingly connected with the frame, a container removably carried by said element, means on the element for locking the same closed relative to the frame, spaced members on the frame, and a cleat on the container and slidable between the members for detachably retaining the container upon the element.

3. A device of the character described, comprising a frame adapted to be mounted in an opening of an enclosure, a combined supporting and closure element swingingly connected with the frame, a container removably carried by said element, means on the element for locking the same closed relative to the frame, spaced members on the frame, a cleat on the container and slidable between the members for detachably retaining the container upon the element, and means on the element forming an abutment for the container.

4. A device of the character described, comprising a frame adapted to be mounted in an opening of an enclosure, a combined supporting and closure element swingingly connected with the frame, a container removably carried by said element, means on the element for locking the same closed relative to the frame, spaced members on the frame, a cleat on the container and slidable between the members for detachably retaining the container upon the element, means on the element forming an abutment for the container, and means on the container forming an abutment for the element.

5. In a device of the character described, the combination of a frame adapted to be mounted in an opening of an enclosure, of means on the frame for slidably and detachably supporting a container and permitting it to be swung with its pivotal axis at one end thereof through the frame to be projected within the enclosure and reversely swung outwardly for access thereto.

6. In a device of the character described, the combination of a frame adapted to be mounted in an opening of an enclosure, of means on the frame for slidably and detachably supporting a container and permitting it to be swung with its pivotal axis at one end thereof through the frame to be projected within the enclosure and reversely swung outwardly for access thereto, and means on the supporting means to lock it closed relative to the frame.

7. A device of the character described comprising a frame formed from a single length of wire bent into substantial rectangular shape and adapted to be mounted in an opening of an enclosure, keepers bent from the end of the frame, a combined supporting and closure element having outer open loops and spaced parallel arms swingingly connected to one end of the frame, a container having a cleat slidably engaged between the arms and detachably supporting said container thereon, and resilient latching elements connected with the frame and engaged through the loops for latching engagement with the keepers on the frame to hold the element locked and closed relative to said frame.

In testimony whereof, I affix my signature hereto.

CEPHAS C. BUCK.